(12) United States Patent
Larcher et al.

(10) Patent No.: US 10,148,507 B2
(45) Date of Patent: Dec. 4, 2018

(54) PARKING LOT MANAGEMENT SYSTEM

(71) Applicant: Robert Bosch GmbH, Stuttgart (DE)

(72) Inventors: Nils Larcher, Korntal (DE); Martin Werner, Tuebingen (DE); Wolf-Bastian Poettner, Leinfelden-Echterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 240 days.

(21) Appl. No.: 15/165,792

(22) Filed: May 26, 2016

(65) Prior Publication Data

US 2016/0359671 A1 Dec. 8, 2016

(30) Foreign Application Priority Data

Jun. 2, 2015 (DE) .................. 10 2015 210 116

(51) Int. Cl.
| | |
|---|---|
| *G06F 15/177* | (2006.01) |
| *H04L 12/24* | (2006.01) |
| *H04W 4/02* | (2018.01) |
| *G08G 1/14* | (2006.01) |
| *H04W 84/18* | (2009.01) |

(52) U.S. Cl.
CPC .......... *H04L 41/0886* (2013.01); *G08G 1/14* (2013.01); *H04L 41/0806* (2013.01); *H04W 4/02* (2013.01); *H04W 84/18* (2013.01)

(58) Field of Classification Search
CPC ... H04L 41/0886; H04L 41/0806; G08G 1/14; H04W 4/02
USPC ........................................... 709/220
See application file for complete search history.

(56) References Cited

U.S. PATENT DOCUMENTS

| | | | |
|---|---|---|---|
| 8,830,088 B2 | 9/2014 | Hod et al. | |
| 8,994,560 B2* | 3/2015 | Anderson | G08G 1/143 340/901 |
| 9,041,557 B2 | 5/2015 | Tannemaat et al. | |
| 9,357,385 B2 | 5/2016 | Benoit et al. | |
| 9,361,265 B2 | 6/2016 | Falk et al. | |
| 2006/0212344 A1* | 9/2006 | Marcus | G07B 15/02 705/13 |
| 2006/0250278 A1* | 11/2006 | Tillotson | G08G 1/14 340/932.2 |
| 2007/0093975 A1 | 4/2007 | Hoogenboom | |
| 2009/0192950 A1* | 7/2009 | King | G06Q 30/0284 705/418 |

(Continued)

FOREIGN PATENT DOCUMENTS

WO 2013131546 A1 9/2013

*Primary Examiner* — Vivek Srivastava
*Assistant Examiner* — Atta Khan
(74) *Attorney, Agent, or Firm* — Norton Rose Fulbright US LLP; Gerard Messina

(57) ABSTRACT

A parking lot management system includes a management server, a vehicle sensor for detecting a motor vehicle in a parking space and for transmitting a detection result to the management server, and furthermore a configuration server as well as a mobile device. The mobile device is designed to transmit an identification of the vehicle sensor to the configuration server. The configuration server is designed to transmit to a vehicle sensor, whose identification it previously received from the mobile device, a configuration that includes communication data for communicating with the management server.

8 Claims, 1 Drawing Sheet

(56) References Cited

U.S. PATENT DOCUMENTS

| | | | | |
|---|---|---|---|---|
| 2012/0092190 A1* | 4/2012 | Stefik | G06Q 10/02 340/932.2 |
| 2012/0274482 A1* | 11/2012 | Chen | G08G 1/144 340/932.2 |
| 2013/0120160 A1* | 5/2013 | Ren | G08G 1/144 340/932.2 |
| 2015/0149263 A1* | 5/2015 | Stenneth | G07B 15/02 705/13 |
| 2015/0294567 A1* | 10/2015 | De La Plaza Ortega | G08G 1/144 340/932.2 |
| 2015/0310744 A1* | 10/2015 | Farrelly | G06Q 10/063114 340/932.2 |
| 2016/0133134 A1* | 5/2016 | Todasco | G07B 15/02 705/13 |
| 2016/0359671 A1* | 12/2016 | Larcher | H04L 41/0886 |
| 2017/0041739 A1* | 2/2017 | Kumar | G06K 7/10366 |
| 2017/0243486 A1* | 8/2017 | Gruteser | B60Q 9/004 |

* cited by examiner

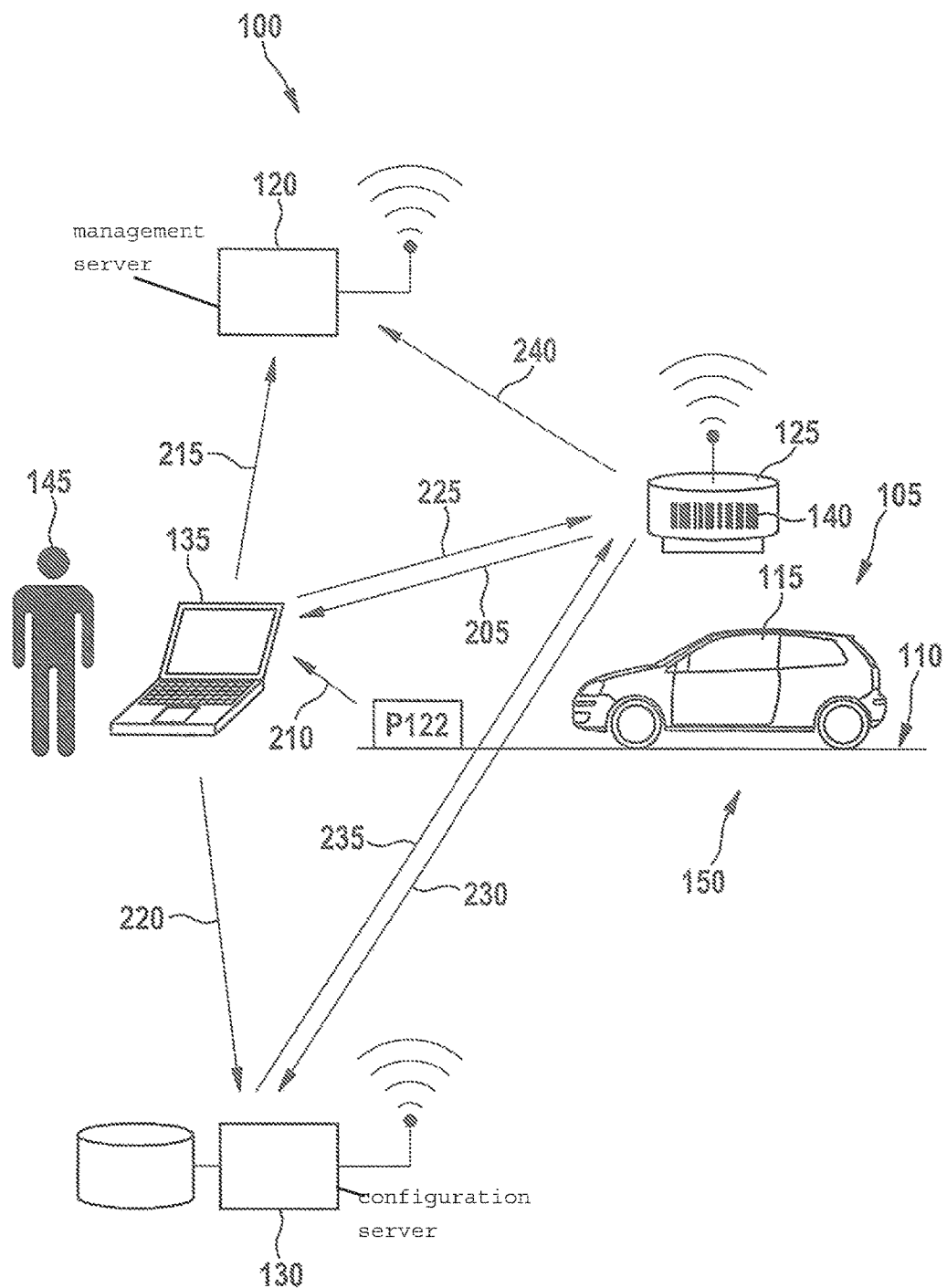

PARKING LOT MANAGEMENT SYSTEM

CROSS REFERENCE

The present application claims the benefit under 35 U.S.C. § 119 of German Patent Application No. DE 102015210116.9 filed on Jun. 2, 2015, which is expressly incorporated herein by reference in its entirety.

FIELD

The present invention relates to a parking lot management system. In particular, the present invention relates to the configuration of the parking lot management system.

BACKGROUND INFORMATION

A parking lot management system is designed to determine an occupancy state of one or multiple parking spaces of a parking lot and to manage the parking spaces. This may include for example the reservation of parking spaces or the charging for utilized parking spaces. The management is usually performed with the aid of a management server. In order to communicate to the server as to which parking space of the parking lot is occupied by a motor vehicle and which is not, a vehicle sensor is provided at each parking space. The vehicle sensor scans the parking space, for example optically or using ultrasound, and determines whether a motor vehicle is located in the parking space. The result of the scan is then transmitted from the vehicle sensor to the management server. This transmission may occur in particular wirelessly. For the wireless communication, a wireless gateway may also be provided and a portion of the communication path may also include a wired network.

In order to take the parking lot management system into operation or to reconfigure it, it is necessary to determine an assignment of parking lot sensors to parking spaces and to ensure that this is known on the side of the management server. For this purpose, each individual vehicle sensor must usually be configured in order to be able to transmit an identification of the respectively monitored parking space together with the monitoring result to the management server. A configuration of this kind is usually time-consuming and lacking in flexibility. Multiple operators may be required to carry out the configuration. The configuration may thus be costly and prone to errors.

SUMMARY

It is an object of the present invention to provide improved technology for configuring a parking lot management system. The present invention may achieve this objective, as described below.

An example parking lot management system includes a management server, a vehicle sensor for detecting a motor vehicle in a parking space and for transmitting a detection result to the management server, and furthermore a configuration server as well as a mobile device. The mobile device is designed to transmit an identification of the vehicle sensor to the configuration server. The configuration server is designed to transmit to a vehicle sensor, whose identification it previously received from the mobile device, a configuration that includes communication data for communicating with the management server.

Advantageously, in the example management system, no individual configuration, required in connection with the production of the vehicle sensor, is required for the communication with the configuration server or the mobile device. The vehicle sensor may be designed to communicate with all potential communication partners or with communication partners of a predetermined type. In another specific embodiment, the vehicle sensor is configured at the factory to communicate only with the mobile device or only with the communication server.

A configuration or a reconfiguration of the vehicle sensor may occur via the interfaces that are provided in any event for communicating with the management server. A separate interface, in particular for the configuration, may not be required.

The mobile device may furthermore be designed to transmit the identification and a position of the vehicle sensor to the management server. The assignment of the vehicle sensor to a parking space may thus occur in connection with the configuration via the mobile device. For this purpose, it is not necessary to connect the mobile device with the individual vehicle sensor.

An installation or configuration of the parking lot management system may be simple and flexible. An error-proneness of the management system with respect to a misconfiguration may be low. The configuration or reconfigurations maybe performed in a simple manner and with little expenditure. A trained service technician may be provided for the implementation, it also being possible for the management system to be designed in such a way that an untrained person is able to perform the configuration.

The vehicle sensor may be designed to transmit its identification to the configuration server, the configuration server being designed to transmit a configuration to the vehicle sensor only if the configuration server received the identification of the vehicle sensor within a specified time window. For this purpose, the time window begins when or after the configuration server receives the identification from the mobile device. This makes it possible to prevent a release of communication information to an unauthorized device.

It is preferred that the identification be attached to the vehicle sensor in an optically scannable manner. For example, the identification may be made up of a string of numerals or symbols that are represented on the outside of the vehicle sensor. The representation is preferably machine-readable, but may also be readable by persons or a version readable by persons may be additionally provided. In one specific embodiment, a bar code or a two-dimensional image code (QR code) is provided. Other options for detecting the identification using the mobile device include for example RFID or NFC. For this purpose, for example, a passive so-called tag may be attached to the vehicle sensor, which contains the identification of the vehicle sensor. Usually, today's mobile devices already have NFC capabilities.

The mobile device is preferably designed to scan the identification of the vehicle sensor optically. For this purpose, for example, a camera or a bar code reader may be provided.

A position of the parking space may be defined via its identification. The position may affixed in optically scannable fashion in the area of the parking space in a manner similar to the identification of the vehicle sensor. The position may be defined, for example, via a parking space number, the parking space number being represented at the parking space in machine-readable or person-readable fashion, for example on a sign or on the device for anchoring the sensor.

In another specific embodiment, multiple management servers are provided, and the mobile device has a memory for multiple communication data for the individual management servers. The question which communication data are to be used for a specific vehicle sensor may be decided for example by an operator of the mobile device or by a configuration on the side of the configuration server. In another specific embodiment, the communication data for one of multiple management servers included in the parking lot management system may also be input into the mobile device by the operator.

A method for configuring a parking lot management system, which includes a vehicle sensor, a configuration server and a management server, includes steps of detecting an identification of the vehicle sensor, of transmitting the detected identification to the configuration server, of transmitting the identification from the vehicle sensor to the configuration server and of transmitting connection data from the configuration server to the vehicle sensor, the connection data being applicable for communication with the management server.

Subsequently, the vehicle sensor is able to determine an occupancy state of the parking space and transmit it directly to the management server.

In another specific embodiment, furthermore, a position of the vehicle sensor is detected. This step may occur at any desired time and is preferably executed via the mobile device. Before the management server takes up its management activity, this information must be available to the management server.

A computer program product has program code for carrying out the method described when it is run on a processing device or is stored on a computer-readable data carrier.

BRIEF DESCRIPTION OF THE DRAWING

The present invention is described below in greater detail with reference to the FIGURE.

FIG. 1 shows a parking lot management system and a method for configuring the parking lot management system.

DETAILED DESCRIPTION OF EXAMPLE EMBODIMENTS

FIG. 1 shows a parking lot management system 100. Parking lot management system 100 is designed to manage a parking lot 105 that includes one or multiple parking spaces 110 for motor vehicles 115. Parking lot 105 may comprise for example underground parking, a parking garage or an open parking area. An open parking area may be also include a parking space on a street, a so-called park box.

Parking lot management system 100 includes a management server 120, a vehicle sensor 125, a configuration server 130 and a mobile device 136. Management server 120 and configuration server 130 may be designed so as to be logically and/or physically integrated with each other. Management server 120 is designed to perform a management task with respect to parking lot 105. This management task may include for example a reservation of unoccupied parking spaces 110 or a charging for occupied parking spaces 110. Other possible tasks include controlling a flow of traffic between parking spaces 110 or evaluating a usage behavior.

The representation of FIG. 1 shows communication paths between individual components, which are, unless indicated otherwise, preferably partially or entirely wireless, for example using Bluetooth or WLAN technology. For this purpose, one or multiple wireless gateways may be provided, which are not shown separately in FIG. 1. One may also speak of indirect communication when using a gateway.

Vehicle sensor 125 is designed to check for the presence of a motor vehicle 115 in a specified parking space 110. For this purpose, vehicle sensor 125 may be situated for example above or below, in a different specific embodiment however even in between, in the area of parking space 110. For scanning motor vehicle 115, it is possible to use for example a radar sensor, a lidar sensor, an ultrasonic sensor, a camera, a photoelectric barrier, a magnetic sensor or another sensor. Vehicle sensor 125 furthermore includes a communication interface for communicating with other devices, in particular with management server 120, configuration server 130 and/or mobile device 135. This interface is preferably embodied to be wireless, but it may also be wired. Vehicle sensor 125 is assigned a definite identification 140, which may be for example a numerical string or a symbol string. Identification 140 may be read out from outside, for example optically. For this purpose, identification 140 is preferably reproduced on the outside of vehicle sensor 125 in a way that is readable by a machine and/or by a person. In the representation of FIG. 1, identification 140 is applied as a bar code on the outside of vehicle sensor 125.

Configuration server 130 is designed to receive a configuration request of a vehicle sensor 125, to verify its qualification and, if applicable, to return a configuration. The configuration includes communication data for management server 120 and may include additional information, for example a frequency with which the state of the parking lot, that is, the presence of a motor vehicle 115 in parking space 110, is to be determined. Preferably, multiple configurations are stored in a memory of configuration server 130, it being possible for a selection of one of multiple different configurations to be performed by the configuration server 130 itself or by an appropriate message of mobile device 135.

Mobile device 135 is designed to be operated by an operator 145 in order to configure parking lot management system 100. The configuration may in particular include an assignment of a vehicle sensor 125 to a parking space 110. For this purpose, identification 140 may be in particular associated with a position 150. This assignment is usually communicated to management server 120. Position 150 of parking space 110 may be provided for example by a parking lot number or another definite identification within parking lot 105. In another specific embodiment, position 150 may also refer to another reference system than parking lot 105, for example to a geodetic system. It is thereby possible to express a geodetic position. If position 150 is defined with reference to a global geodetic system, as defined in particular in WGS 84, then it may be determined for example using a receiver for satellite navigation signals (GPS, GLONASS, Galileo). Such a receiver may be provided in mobile device 135.

FIG. 1 furthermore shows a method 200 for configuring parking lot management system 100. Method 200 is usually carried out only in the context of a configuration or reconfiguration of parking lot management system 100. A normal operation of parking lot management system 100 does not require method 200. The shown steps of method 200 assume that operator 145 moves with mobile device 135 into the area of parking space 110.

Method 200 starts with a step 205, in which the identification 140 of vehicle sensor 125 is determined. In a subsequent step 210, position 150 of parking space 110 is determined as well and thus—with sufficiently precise approximation—the position of vehicle sensor 125. One or both of the items of information 140, 150 may be input by operator 145 into mobile device 135 or detected by a detection device of the mobile device 135.

In a step 215, identification 140 and position 150 are subsequently transmitted from mobile device 135 to management server 120 in order to store the assignment of the respective vehicle sensor 125 to the respective parking space 110. In another specific embodiment, identification 140 and position 150 may also be transmitted from mobile device 135 to configuration server 130 and from there later to management server 120. Position 150 may also be transmitted to vehicle sensor 125 in order to be passed on later together with identification 140 to configuration server 130. In yet another specific embodiment, position 150 and identification 140 take different paths to management server 120. In the end, it is only decisive that the combination of identification 140 and position 150 is made known on the side of management server 120 in order to allow for the management of parking lot 105.

It is also possible to provide multiple management servers 120, one of which is assigned to vehicle sensor 125. A selection of the suitable management server 120 may be performed on the basis of position 150, of identification 140 or another heuristics. The selection may be performed automatically or by operator 145. The selection may be made on mobile device 135 or in configuration server 130.

In a step 220, identification 140 of vehicle sensor 125 is transmitted from mobile device 135 to configuration server 130. Configuration server 130 is preferably designed, following the reception of identification 140, to wait in step 230 for a specified time window for a configuration request of vehicle sensor 125. If the time window passes unused, then step 220, and, if applicable, steps of method 200 to be carried out previously, must be performed anew in order to open another time window.

In a step 225, vehicle sensor 125 is activated or switched on. This may be done manually or via the wireless connection to mobile device 135. In a step 230, vehicle sensor 125 thereupon contacts configuration server 130 by presenting at least its identification 140. This transmission corresponds to a configuration request of vehicle sensor 125 to configuration server 130. The communication data required for this purpose may be permanently imprinted in vehicle sensor 125 during its manufacture for example. A dedicated communication interface for configuring vehicle sensor 125 may be advantageously omitted.

Steps 220 and 225 may also be performed in reverse order; in this case, however, multiple connection attempts may be required between vehicle sensor 125 and configuration server 130.

In a step 235, configuration server 130 responds with a configuration or with configuration information, which it transmits to vehicle sensor 125. The configuration includes communication data for management server 120 and optionally additional configuration data. If multiple possible configurations are present in configuration server 130, configuration server 130 is able to select one of these, which it then transmits to vehicle sensor 125. In particular, on the basis of an assignment of vehicle sensor 125 to one of multiple management servers 120, it is possible to select a suitable configuration for transmission. This selection may also be made on the side of mobile device 135, it being possible to transmit in the message of step 220 also a corresponding selection indication to configuration server 130.

On the side of vehicle sensor 125, all communication information is thus present for communication with the assigned management server 120, and management server 120 knows the assignment of vehicle sensor 125 to parking lot 105 such that the configuration of parking lot management system 100 may thus be concluded. Subsequently, in a step 240, it is possible to transmit a message from vehicle sensor 125 to management server 120 as often as desired. This message preferably includes an occupancy state of parking space 110, to which vehicle sensor 125 is assigned.

What is claimed is:

1. A parking lot management system, comprising:
   a management server;
   a vehicle sensor that is assigned an identification, is positioned at a parking space, and is configured to detect motor vehicle occupation statuses of the parking space;
   a configuration server; and
   a mobile device configured to transmit the identification of the vehicle sensor to the configuration server, based on which transmission the configuration server is configured to transmit to the vehicle sensor a configuration that includes communication data, wherein the vehicle sensor is configured to subsequently, based on the configuration transmitted to the vehicle sensor, transmit to the management server the motor vehicle occupation statuses that the vehicle sensor detects;
   wherein:
   the vehicle sensor is designed to transmit its identification to the configuration server; and
   the configuration server is designed to transmit the configuration to the vehicle sensor in response to the transmission of the identification to the configuration server by the vehicle sensor only if the configuration server receives the identification from the vehicle sensor within a predefined time window beginning when the configuration server receives the identification from the mobile device.

2. The parking lot management system as recited in claim 1, wherein the mobile device is designed to transmit the identification and a position of the vehicle sensor to the management server, which is configured to subsequently associate the motor vehicle occupation statuses received from the vehicle sensor with the parking space based on the transmitted identification and position.

3. The parking lot management system as recited in claim 1, wherein the identification is attached to the vehicle sensor in an optically scannable fashion.

4. The parking lot management system as recited in claim 3, wherein the mobile device is designed to scan the identification of the vehicle sensor optically.

5. The parking lot management system as recited in claim 1, wherein multiple management servers, are provided and the mobile device has a memory for multiple communication data for the management servers.

6. A method for deploying a vehicle sensor into a parking lot management system, the parking lot management system, after the deployment, including (a) the vehicle sensor, which is assigned an identification, is positioned at a parking space, and is configured to detect motor vehicle occupation statuses of the parking space, (b) a configuration server, and (c) a management server, the method comprising:
   transmitting, by a mobile device and to the configuration server, the identification assigned to the vehicle sensor;
   the vehicle sensor transmitting the identification assigned to the vehicle sensor to the configuration server; and
   responsive to the identification received by the configuration server from the vehicle sensor and based on reception, by the configuration server and from the mobile device, of the identification, transmitting connection data from the configuration server to the vehicle sensor, wherein the vehicle sensor is configured to subsequently, based on the connection data transmitted by the configuration server to the vehicle sensor, transmit to the management server the motor vehicle occupation statuses that the vehicle sensor detects;

wherein the transmission of the connection data to the vehicle sensor in response to the identification received by the configuration server from the vehicle sensor is performed by the configuration server only if, and responsive to a determination that, the configuration server receives the identification from the vehicle sensor within a predefined time window beginning when the configuration server receives the identification from the mobile device.

7. The method as recited in claim 6, further comprising: detecting a position of the vehicle sensor; and transmitting to the management sever the identification assigned to the vehicle sensor and the detected position, wherein the management server is configured to subsequently associate the motor vehicle occupation statuses received from the vehicle sensor with the parking space based on the transmitted identification and position.

8. A non-transitory computer-readable storage medium storing a computer program for deploying a vehicle sensor into a parking lot management system, the parking lot management system, after the deployment, including (a) the vehicle sensor, which is assigned an identification, is positioned at a parking space, and is configured to detect motor vehicle occupation statuses of the parking space, (b) a configuration server, and (c) a management server, the computer program being executable by a processor of the configuration server and, when executed by the processor, causing the processor to perform a method comprising:

receiving the identification assigned to the vehicle sensor from a mobile device;

receiving the identification assigned to the vehicle sensor from the vehicle sensor; and based on the receipt of the identification from the mobile device, respond to the receipt of the identification from the vehicle sensor by transmitting connection data to the vehicle sensor, which is configured to subsequently, based on the connection data transmitted by the configuration server to the vehicle sensor, transmit to the management server the motor vehicle occupation statuses that the vehicle sensor detects;

wherein the transmission of the connection data to the vehicle sensor in response to the receipt of the identification by the configuration server from the vehicle sensor is performed by the configuration server only if, and responsive to a determination that, the configuration server receives the identification from the vehicle sensor within a predefined time window beginning when the configuration server receives the identification from the mobile device.

* * * * *